(12) United States Patent
Yoshida et al.

(10) Patent No.: US 7,376,447 B2
(45) Date of Patent: May 20, 2008

(54) MOBILE TELEPHONE

(75) Inventors: Mamoru Yoshida, Yokosuka (JP); Tsutomu Abe, Kawasaki (JP); Tetsuya Kubo, Yokohama (JP); Toru Yanashima, Yokohama (JP); Toshiyasu Kitamura, Kakegawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 384 days.

(21) Appl. No.: 10/493,122

(22) PCT Filed: Jul. 1, 2002

(86) PCT No.: PCT/JP02/06643

§ 371 (c)(1),
(2), (4) Date: Apr. 19, 2004

(87) PCT Pub. No.: WO03/043295

PCT Pub. Date: May 22, 2003

(65) Prior Publication Data

US 2004/0248625 A1    Dec. 9, 2004

(30) Foreign Application Priority Data

Oct. 19, 2001    (JP)    .............................. 2001-322540

(51) Int. Cl.
*H04M 1/00*    (2006.01)

(52) U.S. Cl. ............... 455/569.1; 455/90.3; 455/575.1; 455/575.3

(58) Field of Classification Search ............ 455/569.1, 455/90.3, 575.3, 350, 575.1; 379/420.01, 379/420.02, 433.02
See application file for complete search history.

(56) References Cited

U.S. PATENT DOCUMENTS 5,463,687 A * 10/1995 Takizawa ............... 379/433.13
5,933,783 A *  8/1999 Kawakami et al. ......... 455/566
6,014,573 A *  1/2000 Lehtonen et al. ........ 455/569.1

(Continued)

FOREIGN PATENT DOCUMENTS

CN    1264995    8/2000

(Continued)

*Primary Examiner*—Lana Le
*Assistant Examiner*—April S. Guzman
(74) *Attorney, Agent, or Firm*—Pearne & Gordon LLP (57) ABSTRACT

In a portable telephone, a display device, a telephone receiver, a ten-numeral entry key, a telephone transmitter, and the like are mounted on surface sides of a first housing (1) and a second housing (2), which are located on inner sides thereof when the first housing and the second housing are closed, both the first housing and the second housing being hinged to each other via a hinge portion in a freely openable/closable manner; and a speaker for producing at least a telephone call-receiving sound is provided on the surface side of any one of the first housing, the second housing, and the hinge portion. Also, a sound projection portion (12) for projecting the telephone call-receiving sound produced from the speaker is formed in a side of the portion where the speaker is provided even under such a condition that the first housing and the second housing are closed. As a result, the speaker sounds can be projected forwardly in sufficiently high levels even under such a condition that the first and second housings are opened, and furthermore, the telephone call-receiving sound can also be heard in sufficiently high levels even under such a condition that the first and second housings are closed.

8 Claims, 5 Drawing Sheets

U.S. PATENT DOCUMENTS

| | | | | |
|---|---|---|---|---|
| 6,104,808 | A * | 8/2000 | Alameh et al. | 379/433.02 |
| 6,359,984 | B1 * | 3/2002 | Kim | 379/433.02 |
| 6,377,827 | B1 * | 4/2002 | Rydbeck | 455/575.3 |
| 6,704,586 | B2 * | 3/2004 | Park | 455/575.3 |
| 6,731,959 | B1 * | 5/2004 | Kumagai et al. | 455/575.3 |
| 6,751,446 | B1 * | 6/2004 | Kim et al. | 455/90.1 |
| 6,775,560 | B2 * | 8/2004 | King et al. | 455/566 |
| 6,819,939 | B2 * | 11/2004 | Masamura | 455/550.1 |
| 6,904,298 | B2 * | 6/2005 | Arai et al. | 455/556.1 |
| 6,933,981 | B1 * | 8/2005 | Kishida et al. | 348/375 |
| 6,965,413 | B2 * | 11/2005 | Wada | 348/376 |
| 7,047,052 | B2 * | 5/2006 | Akai et al. | 455/575.1 |
| 7,187,958 | B2 * | 3/2007 | Nishijima et al. | 455/575.3 |
| 2002/0016191 | A1 * | 2/2002 | Ijas et al. | 455/575 |
| 2002/0042287 | A1 * | 4/2002 | Asami | 455/550 |
| 2003/0003945 | A1 * | 1/2003 | Saiki et al. | 455/550 |
| 2003/0030624 | A1 * | 2/2003 | Aoyama | 345/168 |
| 2003/0125095 | A1 * | 7/2003 | Hwang | 455/567 |
| 2003/0224832 | A1 * | 12/2003 | King et al. | 455/566 |
| 2004/0023697 | A1 * | 2/2004 | Komura | 455/569.1 |
| 2004/0097258 | A1 * | 5/2004 | Lee et al. | 455/550.1 |
| 2004/0203527 | A1 * | 10/2004 | Matsumoto | 455/90.3 |
| 2004/0204012 | A1 * | 10/2004 | Kakinuma | 455/550.1 |
| 2004/0209654 | A1 * | 10/2004 | Cheung et al. | 455/567 |
| 2004/0253995 | A1 * | 12/2004 | Matsumoto et al. | 455/569.1 |
| 2005/0083351 | A1 * | 4/2005 | Kawamoto et al. | 345/660 |
| 2005/0233766 | A1 * | 10/2005 | Futami | 455/556.1 |
| 2005/0282596 | A1 * | 12/2005 | Park et al. | 455/575.3 |
| 2006/0148540 | A1 * | 7/2006 | Satoh et al. | 455/575.3 |

FOREIGN PATENT DOCUMENTS

| | | | |
|---|---|---|---|
| GB | 2 347 302 A | | 8/2000 |
| GB | 2347302 A | * | 8/2000 |
| JP | 2000-101697 | | 4/2000 |
| JP | 2000-244607 | | 9/2000 |
| JP | 2000-244618 | | 9/2000 |
| JP | 2000-333146 | | 11/2000 |
| JP | 2001-237936 | | 8/2001 |

* cited by examiner

MOBILE TELEPHONE

TECHNICAL FIELD

The present invention mainly relates to a foldable portable telephone, and more specifically, relates to a portable telephone capable of improving audibility thereof.

BACKGROUND ART

In general, foldable portable telephones are being utilized by a large number of users. Since these portable telephones are foldable during portable conditions and thus can be made compact, and furthermore, various sorts of keys are located on the inner sides and are not operated in careless manners under such a condition that these portable telephones are folded, these portable telephones are very convenient as to portabilities thereof.

On the other hand, in any of these sorts of foldable portable telephones, while telephone transmitters and telephone receivers are mounted on portions positioned far from hinge portions of housings, speakers for producing telephone call-receiving sounds are mounted on the side of rear surfaces of the housings, which have display devices. As a consequence, even when the housings are closed and these portable telephones are transported, if telephone calls are received, then telephone call-receiving sounds are projected from the rear surfaces of the housings to be heard in satisfactable sound levels. Thus, while the housings are opened and then both the telephone transmitters and the telephone receivers are moved close to mouths and ears of the users, these portable telephones can be readily used by the user, resulting in very convenience.

Very recently, not only these using methods of the portable telephones are required, but also such a need is made. That is, time signals, weather forecast, and voice sent from other telephone communication counter parties may be outputted from the speakers, and furthermore, voice sent from a telephone communication counter party may be directly outputted from these speakers, namely the speakers may be used as speakers for hand-free telephone operation. However, the above-explained constructions of these foldable portable telephones could not sufficiently meet this requirement. In other words, since the speakers are mounted on the rear surfaces of the housings, the voice reproduced from the speakers is projected along the backward directions far from the users under such a condition that the housings are opened, so that the voice of these speakers cannot be propagated to the users in satisfactory sound levels. Otherwise, even when the voice of the speakers is propagated to the users, since this voice is propagated while detouring outer peripheral portions of the housings, there is a serious problem that sound qualities are considerably deteriorated and the user can hardly hear the detoured voice.

DISCLOSURE OF THE INVENTION

The present invention has been made to solve the above-explained conventional problem, and therefore, has an object to provide a portable telephone having a simple construction and having a superior audibility, while the portable telephone directly delivers a time signal, weather forecast, and voice sent from telephone communication counter parties to a user. Also, more specifically, another object of the present invention is to provide such a foldable portable telephone that telephone voice/sounds can be projected to forward directions in sufficiently high levels even under such a condition the housings thereof are opened, and furthermore, telephone call-receiving sounds can be heard in sufficiently high levels even under such a condition that the housings are closed.

To achieve the above-described objects, a portable telephone according to the present invention is featured by that a speaker for producing at least a telephone call-receiving sound is provided on the side of a surface on which a telephone transmitter is provided, in combination with a telephone receiver. With employment of this construction, the speaker is provided on the side of a user, and voice reproduced from the speaker can be directly reached to the user.

Also, to achieve the above-explained objects, a portable telephone according to the present invention is featured by that a display device, a telephone receiver, a ten-numeral entry key, a telephone transmitter, and the like are mounted on surface sides of a first housing and a second housing, which are located on inner sides thereof when the first housing and the second housing are closed, both the first housing and the second housing being hinged to each other via a hinge portion in a freely openable/closable manner; and a speaker for producing at least a telephone call-receiving sound is provided on the surface side of any one of the first housing, the second housing, and the hinge portion. With employment of this construction, under such a condition that the first housing and the second housing are opened, the speaker is provided on the side of a user, and voice reproduced from the speaker can be directly reached to the user.

Also, the portable telephone according to the present invention is arranged by that a sound projection portion for projecting the telephone call-receiving sound produced from the speaker is formed in a side of the portion where the speaker is provided even under such a condition that the first housing and the second housing are closed. With employment of this arrangement, under such a condition that the first housing and the second housing are closed, the telephone call-receiving sound is projected from the sound projection portion provided on the side portion, and thus, the telephone call can be satisfactorily sensed.

Also, the portable telephone according to the present invention is arranged by that the speaker is constituted in such a manner that voice produced from a telephone communication counter party can be outputted from the speaker under telephone communication condition by manipulating an operation unit; and the telephone transmitter is constituted in such a manner that the telephone transmitter is brought into a non-operable state under such a condition that the speaker outputs the voice produced from the telephone communication counter party. With employment of this arrangement, the speaker is used to output the voice sent from the telephone communication counter party by manipulating the operation unit, and the operation of the telephone transmitter is stopped under this condition, so that the voice sent from the telephone communication counter party can be effectively outputted.

Also, the portable telephone according to the present invention is arranged by that an electronic camera is mounted on any one of the first housing and the hinge portion; and the speaker is arranged in such a manner that when the electronic camera is brought into an operable state by manipulating the operation unit, the speaker is operated as a speaker capable of producing a telephone reception sound for hand-free operation. With employment of this arrangement, under such a condition that a picture is photographed by employing the electronic camera and also this photographed picture is transmitted to a telephone communication counter party, this portable telephone can be surely operated under hand-free telephone condition, and thus, the user can use this portable telephone while separating this portable telephone from his ear.

Also, the portable telephone according to the present invention is arranged by that the display device is constituted by that a picture transmitted from a telephone communication counter party can be displayed on the display device; and the speaker is arranged in such a manner that the speaker is operated as a speaker capable of producing the telephone reception sound for hand-free operation under such an operation condition that the picture is displayed. With employment of the above-described arrangement, even in such a case that the user establish a telephone communication while watching a picture transmitted from the telephone communication counter party, the user separates the portable telephone from his ear, and then can effectively use this portable telephone under hand-free operation condition.

It should be noted that in the drawings, a reference numeral 1 refers to a first housing; 2 to a second housing; 3 to a hinge portion; 4 to a display device; 5 to a sound hole for telephone receiver (speaker); 6 to a ten-numeral entry key; 7 to a function key; 8 to a sound hole for a telephone transmitter (microphone); 9 to a sound projection hole for a speaker; 10 to an antenna; 11 to a bank; 12 to a sound projection hole for speaker; 13 to a taper-shaped plane; 14 to a sound hole; 15 and 16 to projections; 20 to an electronic camera; 21 to a speaker; and 22 to a sound hole.

BEST MODE FOR CARRYING OUT THE INVENTION

Referring now to drawings, embodiment modes of the present invention will be described in detail.

Figure 1:
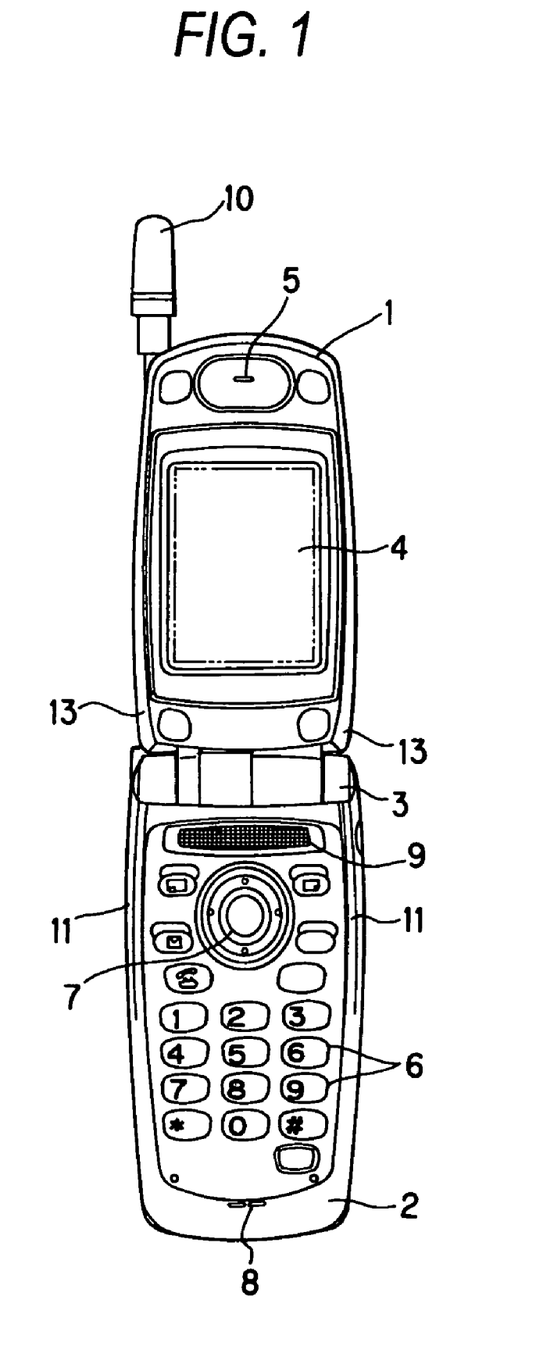
FIG. 1 is a front view of a portable telephone according to a first embodiment mode of the present invention.
Figure 2:
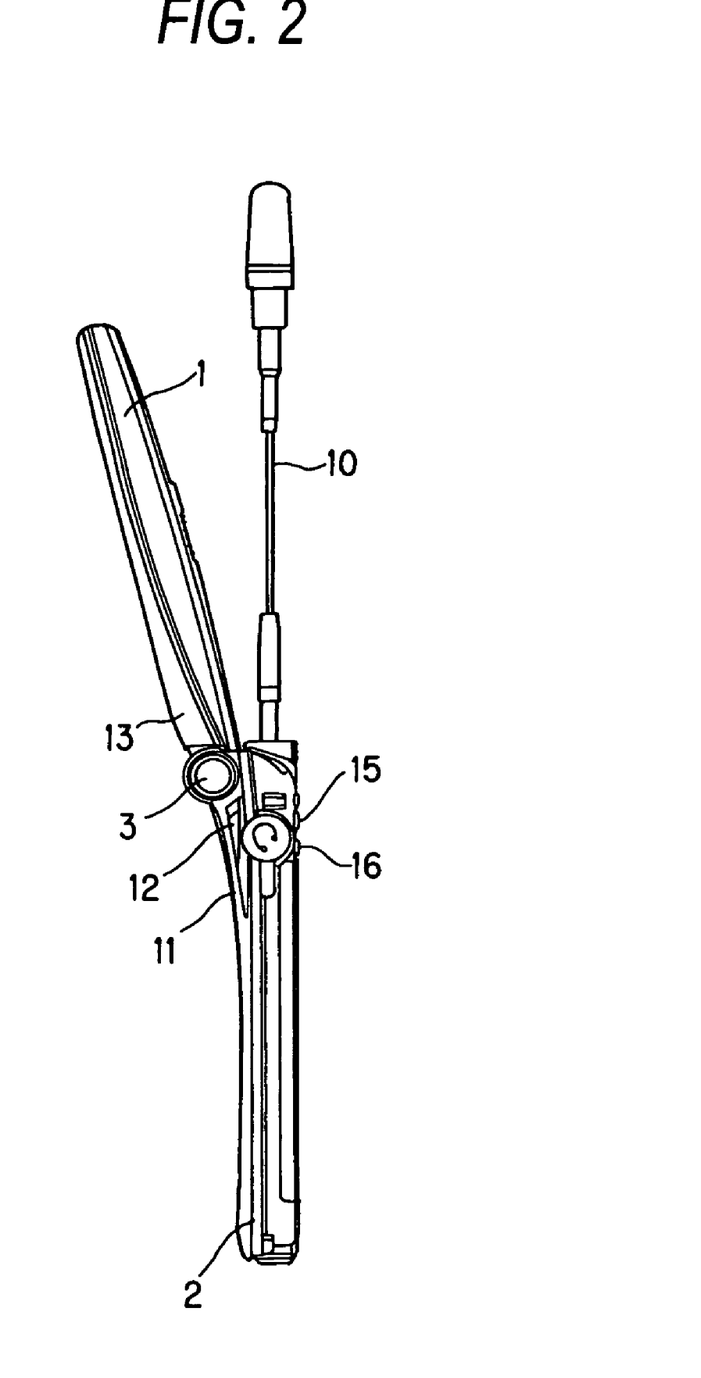
FIG. 2 is a side view of a portable telephone according to the first embodiment mode of the present invention.
Figure 3:
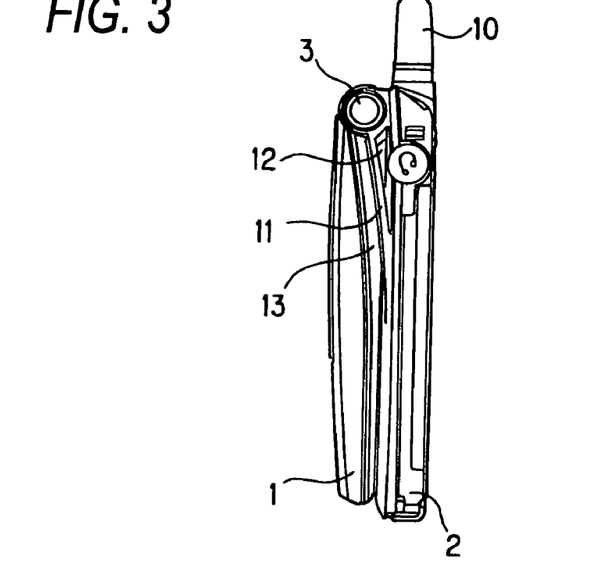
FIG. 3 is a side view for indicating a condition under which a first housing and a second housing of the portable telephone according to the first embodiment mode of the present invention are closed.
Figure 4:
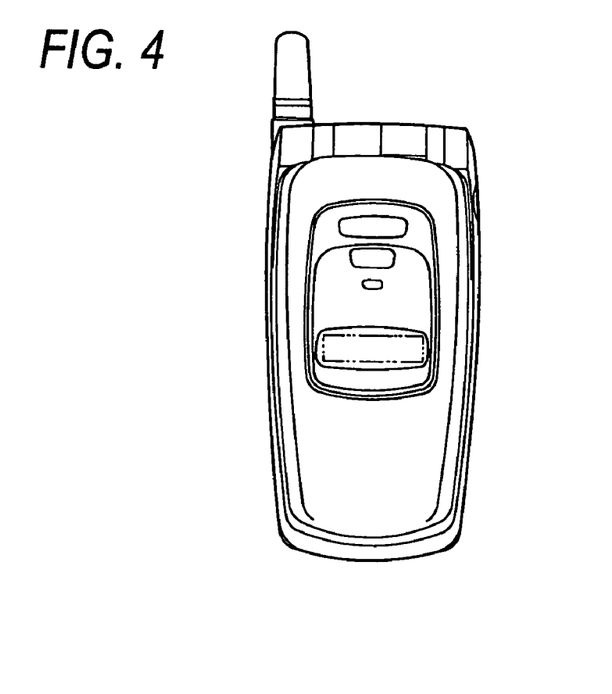
FIG. 4 is a front view for indicating a condition under which the first housing and the second housing of the portable telephone according to the first embodiment mode of the present invention are closed.
Figure 5:
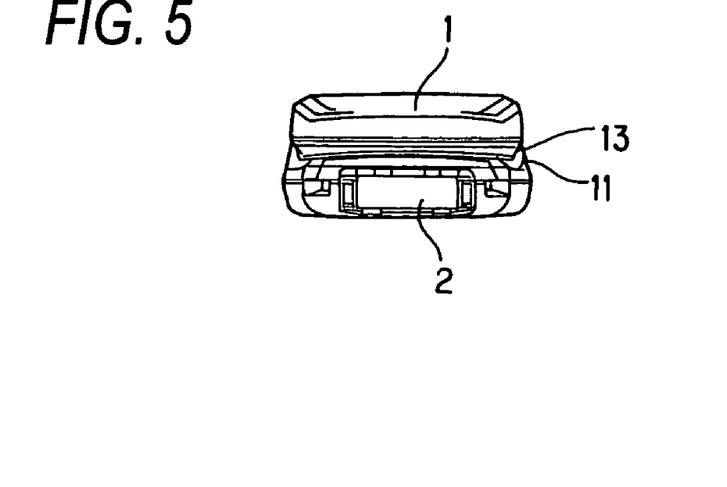
FIG. 5 is a diagram for showing such a condition under which the first housing and the second housing of the portable telephone according to the first embodiment mode of the present invention are closed, as viewed from a forward direction.
Figure 6:
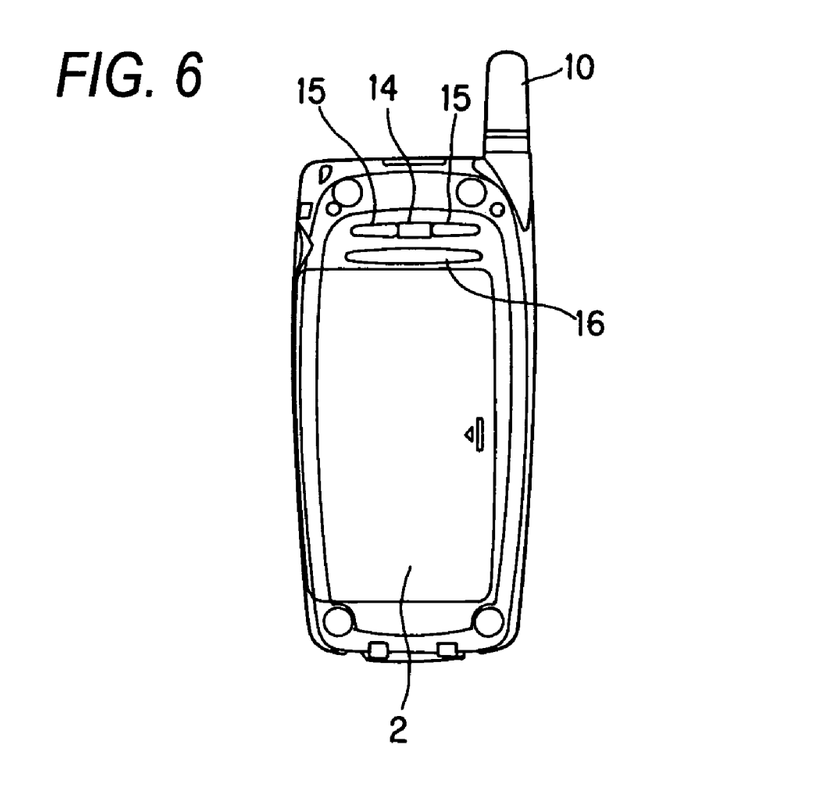
FIG. 6 is a rear view for indicating a condition under which the first housing and the second housing of the portable telephone according to the first embodiment mode of the present invention are closed.

FIG. 1 is a front view of a portable telephone according to a first embodiment mode of the present invention. FIG. 2 is a side view of this portable telephone. FIG. 3 is a side view for indicating a condition under which a first housing and a second housing of the portable telephone are closed. FIG. 4 is a front view for indicating such a condition that the first housing and the second housing of this portable telephone are closed. Also, FIG. 5 is a drawing for indicating such a condition that the first housing and the second housing of this portable telephone are closed, as viewed from a forward direction. Also, FIG. 6 is a rear view for indicating such a condition that the first housing and the second housing of this portable telephone are closed.

In FIG. 1 to FIG. 6, the above-described portable telephone is constructed of a first housing 1, a second housing 2, and a hinge portion 3 which pivotally hinges the first housing 1 and the second housing 2.

A display device 4 is provided on a central portion of a front surface side of the first housing 1, and this front surface side constitutes an inner side under such a condition that the first housing 1 and the second housing 2 are closed. A sound hole 5 for telephone receiver (telephone speaker) is formed in a portion of the first housing 1, which is located far from the hinge portion 3 of the above-described surface.

A ten-numeral entry key 6 used to perform various sorts of operations, and also, various sorts of function keys 7 are provided on a front surface of the second housing 2, and this front surface side constitutes an inner side under such a condition that the first housing 1 and the second housing 2 are closed. A sound hole 8 for telephone transmitter (telephone microphone) is formed in a portion of the second housing 2, which is located far from the hinge portion 3 of the above-described surface. Furthermore, a sound projection hole 2 for speaker is formed in a portion of the second housing, which is located close to the hinge portion 3 of the above-described surface. This sound projection hole 9 for speaker is employed so as to relatively largely produce a call-receiving sound, and voice transmitted from a telephone communication counter party.

It should be understood that although not shown inside the above-explained first housing 1 and second housing 2 which are located opposite to the above-described sound holes 5, 8 and sound projection hole 9, such a fact is obvious that a telephone receiver, a telephone transmitter, and a speaker are mounted.

On the other hand, an extendable/compressible (telescopic) antenna 10 is mounted on the second housing 2 in such a manner that this antenna 10 can be entered/projected from an edge portion of this second housing 2 on the side near the hinge portion 3. Also, as indicated in FIG. 2, the hinge portion 3 is formed under such a condition that this hinge portion 3 is projected from the above-described surface on the surface side of the second housing 2. Also, the hinge portion 3 is constituted by that even under such a condition that the first housing 1 and the second housing 2 are closed, the surface portion having the sound projection hole 12 for speaker of the second housing 2 does not abut against the surface portion of the first housing 1, but a proper space may be formed between both the surface portions of the first housing 1 and the second housing 2.

Then, a bank 11 and another bank 11, which own triangular shapes extended up to both edge portions of the hinge portion 3, are formed on both side portions of the surface of the second housing 1. The sound projection holes 12 and 12 capable of projecting a call-receiving sound produced from the speaker are formed in portions of these banks 11 and 11, which are located near the hinge portion 3 even when both the first housing 1 and the second housing 2 are closed. In other words, plane portions 13 and 13, which have taper shapes, are formed on both the side portions of the first housing 1. The sound projection holes 12 and 12 are formed in the above described banks 11 and 11, which are constituted in such a manner that when the first housing 1 and the second housing 2 are closed, as indicated in FIG. 3 and FIG. 5, these sound projection holes 12 and 12 abut against the inner sides of the banks 11 and 11, or are inserted under such a condition that these sound projection holes 12 and 12 are close contacted to the inner sides of the banks 11 and 11. As a result, voice produced from the speaker can be projected via the space formed between the first housing 1 and the second housing 2, and the sound projection holes 12 and 12 toward side directions of the first and second housings 1 and 2 in a sufficiently high sound level.

Also, as shown in FIG. 2 and FIG. 6, a sound hole 14 is formed in such a portion of a surface of the second housing 2, which corresponds to the above-described speaker and constitutes the outer side of this second housing 2 under such a condition that the first housing 1 and the second housing 2 are closed. This sound hole 14 is used to project therefrom voice produced from the speaker to the above-described surface side. Projections 15, 15, and 16 are formed on both sides of this sound hole 14 and at a position in proximity to this sound hole 14.

Next, a description will now be made of operations and effects of the portable telephone according to the first embodiment mode.

The above-explained speaker is constructed in such a manner that this speaker is operable even under both conditions that the first housing 1 and the second housing 2 are opened and also closed. As a result, when a telephone call is received, a call-receiving sound thereof is produced from the speaker. Under such a condition that the first housing 1 and the second housing 2 are opened, since the sound projection hole 9 for the speaker is exposed, voice produced from the speaker is directly projected via the sound projection hole 9 to the forward direction. Under such a condition that the first housing 1 and the second housing 2 are closed, the plane portions 13 and 13 having the taper shapes of the first housing 1 are inserted between the banks 11 and 11 formed in the second housing 2. Since the space is formed between the first housing 1 and the second housing 2, and also the sound projection holes 12 and 12 are formed in the banks 11 and 11, voice produced from the speaker can be projected via the sound projection holes 12 and 12 to the side direction in a high sound level. Then, since the sound hole 14 is also formed in the surface of the second housing 2, which is located at the outer side thereof under such a condition that both the first housing 1 and the second housing 2 are closed, voice produced from the speaker can be also outputted from this sound hole 14. As a result, this may cause the speaker to be readily driven, and also can realize that voice projected from the sound projection hole 9 which is located on the front surface side of the speaker can have a better sound quality.

Also, since the projections 15, 15, and 16 are formed on the positions in proximity to the sound hole 14, as indicated in FIG. 6, even in such a case that this portable telephone is mounted on a desk top, or the like, while the surface having the above-described sound hole 14 is directed toward the lower direction, voice produced from the speaker can be similarly projected from this sound hole 14, so that a similar effect to the above-explained effect may be achieved.

Also, in the above-described first embodiment mode, the portable telephone is constituted by that since a predetermined key (i.e., any of ten-numeral entry key 6 and function key 7) is manipulated, voice produced from the communication counter party other than the call-receiving sound may be outputted from the speaker. As a consequence, since the above-explained predetermined key is manipulated, voice produced from the communication counter party, and also, for example, a time signal, weather forecast, and the like can be heard in the high sound levels via the speaker by the user and persons gathered around this user. Then, in such a case that, a better sound quality of the above-described voice and the like different from that of the call-receiving sound is more or less required. As previously explained, in accordance with the above-described first embodiment mode, there is such an effect that the relatively superior sound quality may be achieved, and voice can be correctly heard with having better feelings.

Next, a portable telephone according to second embodiment mode of the present invention will now be described.

Figure 7:
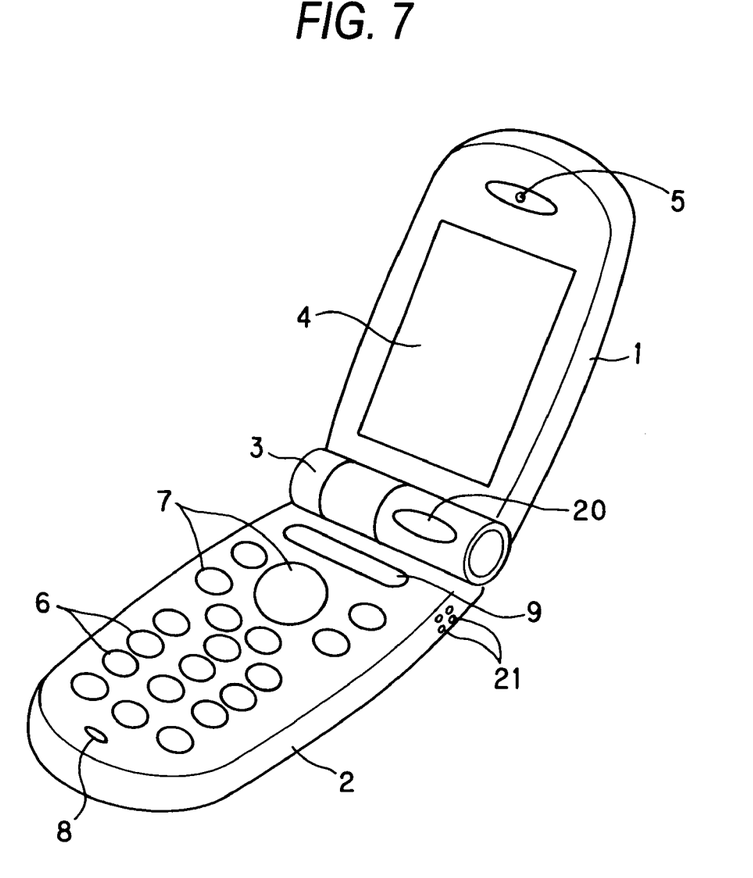
FIG. 7 is a perspective view of a portable telephone according to a second embodiment mode of the present invention.
Figure 8:
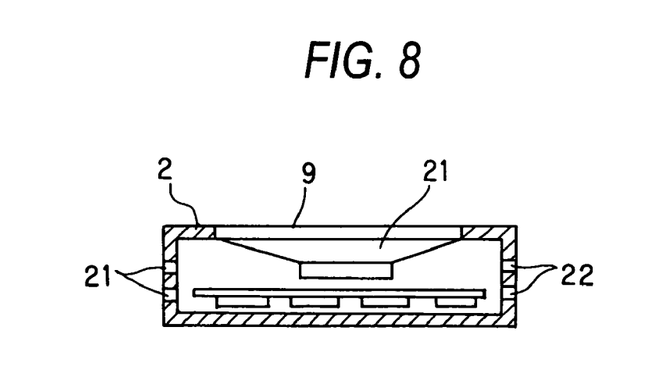
FIG. 8 is a sectional side view of the portable telephone according to the second embodiment mode of the present invention.

FIG. 7 is a perspective view of the portable telephone according to the second embodiment mode of the present invention. FIG. 8 is a sectional side view of the portable telephone according to this second embodiment mode.

It should also be understood that the same reference numerals applied to the structural elements of the first embodiment mode will be employed as these for denoting the essentially same structural elements of this second embodiment mode.

In this second embodiment mode, the portable telephone is arranged as follows. That is, while an electronic camera 20 is pivotally mounted on the hinge portion 3, this electronic camera 20 is brought into an operable condition by manipulating a predetermined camera driving key (namely, any preselected key among ten-numeral entry key 6 and function key 7, or separately provided keys), so that this electronic camera 20 may photograph a forward scene thereof. Then, a picture photographed by this electronic camera 20 is displayed on the display device 4. Also, since a predetermined shutter key is manipulated, a picture photographed at this time is stored in a storage means, and furthermore, since a predetermined transmission key is manipulated, the above-explained picture may be arbitrarily transmitted to the telephone communication counter party.

Also, in this second embodiment mode, the portable telephone is arranged in such a manner that when a picture is transmitted from the telephone communication counter party, this transmitted pictures can be received, and then, the received picture is displayed on the display device 4. Then, the portable telephone is arranged in such a way that since a predetermined key for memory is manipulated, this picture may be stored in the above-described storage means, and also, since a predetermined read key is manipulated, this stored picture may be arbitrarily read out and may be displayed on the display device 4.

Furthermore, in this second embodiment mode, the portable telephone is arranged in such a manner that since a predetermined key for hand-free telephone communication is manipulated, both the telephone transmitter 8 provided on the second housing 2 and the speaker 21 which is built in the second housing 2 located opposite to the sound projection hole 9 for speaker can be operated at the same time, so that the hand-free telephone communication can be carried out.

Also, in this second embodiment mode, the portable telephone is arranged in such manner that the hand-free telephone communication can be carried out by employing both the telephone transmitter 8 and the speaker 21 under such a condition that either the picture photographed by the electronic camera 20 or the picture transmitted from the telephone communication counter party is displayed on the display device 4 so as to perform the telephone communication, namely when these predetermined keys are manipulated, under similar operation executed by automatically manipulating the predetermined key for hand-free telephone communication.

As a consequence, in accordance with the second embodiment mode, when the picture is photographed by employing the electronic camera 20, this photographed picture is transmitted to the telephone communication counter party, or the telephone communication is carried out while the picture is received from the telephone communication counter party, the operation of the portable telephone is automatically and necessarily set to the hand-free telephone communication, so that the telephone communication can be carried out while this portable telephone is separated from either a mouth of a user or an ear of this user and the user directly observes the display device 4.

It should also be understood that in the second embodiment mode, the portable telephone is not arranged in such a manner that under such a condition that the first housing 1 and the second housing 2 are closed, a specific space is formed between the first housing 1 and the second housing 2 as explained in connection with the first embodiment mode. However, instead of such a specific space, since the sound hole 22 is formed in the side surface of the second housing 2, voice produced from the speaker 21 can be effectively projected via this sound hole 22 to the side direction of the housing 2 in a similar manner to that of the first embodiment mode.

Also, in the second embodiment mode, the electronic camera 20 is provided on the hinge portion 3. Apparently, this electronic camera 20 may be provided on the first housing 1, and/or second housing 2.

While the present invention has been described in detail, or with reference to specific embodiment modes, it is obvious for those skilled in the art that the present invention may be modified, changed, and substituted without departing form the technical spirit and scope of the present invention.

The present patent application has been made based upon Japanese Patent Application (Japanese Patent Application No. 2001-322540) filed on Oct. 19, 2001, and contents of this application have been incorporated herein as reference.

INDUSTRIAL APPLICABILITY

As apparent from the above-described embodiment mode, the portable telephone according to the present invention is arranged by that the speaker for producing at least the telephone call-receiving sound is provided on the side of the surface on which the telephone transmitter is provided, in combination with the telephone receiver. Since the speaker is provided on the side of the user, both the telephone call-receiving sound and the telephone communication sound, which are reproduced from the speaker, can be directly reached to the user, so that the user can hear both the telephone call-receiving sound and the telephone communication sound, reproduced from the speaker, in the sufficiently high levels.

Also, the portable telephone according to the present invention is arranged by that the display device, the telephone receiver, the ten-numeral entry key, the telephone transmitter, and the like are mounted on the surface sides of the first housing and the second housing, which are located on the inner sides thereof when the first housing and the second housing are closed, both the first housing and the second housing being hinged to each other via the hinge portion in the freely openable/closable manner; and the speaker for producing at least the telephone call-receiving sound is provided on the surface side of any one of the first housing, the second housing, and the hinge portion. Since the speaker is provided on the side of the user, both the telephone call-receiving sound and the telephone communication sound, which are reproduced from the speaker, can be directly reached to the user, so that the user can hear both the telephone call-receiving sound and the telephone communication sound, reproduced from the speaker, in the sufficiently high levels.

Furthermore, the portable telephone according to the present invention is arranged by that the sound projection portion for projecting the telephone call-receiving sound produced from the speaker is formed in the side of the portion where the speaker is provided even under such a condition that the first housing and the second housing are closed. Thus, even in such a case that the first housing and the second housing are closed to each other and these first and second housings under this closed condition are put on a desk top, the telephone call-receiving sound and the telephone communication sound, which are reproduced from the speaker, can be projected from the sound projection portion formed in the side portion outside the portable telephone in sufficiently high levels, and also, the user can sufficiently hear both the telephone call-receiving sound and the telephone communication sound, which are reproduced from the speaker.

The invention claimed is:

1. A portable telephone comprising:
   a hinge portion;
   a first housing and a second housing, hinged to each other via said hinge portion in an openable/closable manner;
   a display device and an operation unit provided at central portions of surface sides of said first housing and said second housing, respectively, and being located on inner sides thereof when said first housing and said second housing are closed;
   a telephone receiver and a telephone transmitter provided respectively at said surface sides of said first housing and said second housing, which the telephone receiver being located at a first distance from the hinge portion and the telephone transmitter being located at a second distance from the hinge portion; and
   a speaker for notifying a reception of a telephone call and for hand free telephone communication operation the speaker being directed toward said surface sides at a portion of said surface side of at least any one of said first housing and said second housing, the speaker being located a third distance from the hinge portion which is less than the first and second distances, the speaker being located on inner side of said at least any one of said first housing and said second housing when said first housing and said second housing are closed, and the speaker producing a sound when said first housing and said second housing are open.

2. The portable telephone according to claim 1, wherein said first housing and said second housing are hinged to said hinge portion in such a manner that even when said first housing and said second housing are closed, a space is formed between the surface of said first housing and the surface of said second housing at a portion located in proximity to said hinge portion, and wherein under such a condition that said first housing and said second housing are closed, either the telephone call receiving sound or the telephone communication sound produced from said speaker is projected via said space to both side directions of said first housing and said second housing.

3. The portable telephone according to claim 2, wherein a bank is formed on said second housing, by which said space cannot be seen when said first housing and said second housing are closed, and wherein a sound projection hole for projecting both the telephone call receiving sound and said telephone communication sound derived from said space is formed in said bank.

4. The portable telephone according to any one of claims 1 to 3, wherein said speaker is arranged in such a manner that said speaker is operable in combination with said telephone transmitter.

5. The portable telephone according to any one of claims 1 to 3, wherein an electronic camera is mounted on any of said first housing and said hinge portion, and wherein, under such a condition that said electronic camera is operable, said speaker is arranged to be operable as such a speaker which produces a telephone communication sound sent from a telephone communication counter party.

6. The portable telephone according to any one of claims 1 to 3, wherein said display device is constituted in such a manner that a picture sent from a telephone communication counter party can be displayed thereon, and wherein, under such an operation condition that said display device displays thereon the picture sent from said telephone communication counter party, said speaker is arranged to be operable as such a speaker for producing the telephone communication sound derived from said telephone communication counter party.

7. The portable telephone according to claim 1, wherein the telephone receiver comprises a second speaker and a sound hole for the second speaker.

8. The portable telephone according to claim 7, wherein the telephone transmitter comprises a microphone.

* * * * *